US007483027B2

(12) United States Patent
Yoshioka et al.

(10) Patent No.: US 7,483,027 B2
(45) Date of Patent: Jan. 27, 2009

(54) APPARATUS AND METHOD OF CATALOGING TEST DATA BY ICONS

(75) Inventors: Seiichiro Yoshioka, Kyoto (JP); Yoshiyuki Okada, Kyoto (JP); Tatsuo Igushi, Kyoto (JP); Loic Merckel, Kyoto (JP)

(73) Assignee: Horiba, Ltd., Kyoto (JP)

( * ) Notice: Subject to any disclaimer, the term of this patent is extended or adjusted under 35 U.S.C. 154(b) by 351 days.

(21) Appl. No.: 11/206,332

(22) Filed: Aug. 17, 2005

(65) Prior Publication Data

US 2006/0055697 A1 Mar. 16, 2006

(30) Foreign Application Priority Data

Aug. 18, 2004 (JP) ............................ P2004-238144
Nov. 5, 2004 (JP) ............................ P2004-323000

(51) Int. Cl.
*G06T 11/80* (2006.01)
(52) U.S. Cl. ..................................................... 345/440
(58) Field of Classification Search .................. 345/440
See application file for complete search history.

(56) References Cited

U.S. PATENT DOCUMENTS

| 5,301,348 | A  | * | 4/1994  | Jaaskelainen ................. 714/46 |
| 6,539,318 | B2 | * | 3/2003  | Miller et al. .................. 702/66 |
| 6,791,545 | B2 | * | 9/2004  | Miller et al. ................ 345/440 |
| 6,965,383 | B2 | * | 11/2005 | Ritter et al. ................. 345/606 |
| 7,062,718 | B2 | * | 6/2006  | Kodosky et al. ............. 715/771 |
| 2002/0097243 | A1 | * | 7/2002  | Miller et al. ............. 345/440.1 |
| 2002/0109496 | A1 | * | 8/2002  | Miller et al. ................... 324/88 |
| 2003/0107573 | A1 | * | 6/2003  | Miller et al. ................ 345/440 |
| 2003/0107581 | A1 | * | 6/2003  | Ritter et al. ................. 345/606 |
| 2003/0211534 | A1 | * | 11/2003 | Lary et al. .................... 435/7.1 |
| 2006/0106597 | A1 | * | 5/2006  | Stein ........................... 704/203 |
| 2006/0251200 | A1 | * | 11/2006 | Miller ......................... 375/371 |

FOREIGN PATENT DOCUMENTS

JP 2002-163666 6/2002

* cited by examiner

*Primary Examiner*—Kee M Tung
*Assistant Examiner*—Javid A Amini

(57) ABSTRACT

An analyzer according to this invention is configured to retrieve an analysis data file quickly. The analyzer includes: a file storage section (32) configured to store an outcome resulting from an analysis of a subject (S) and subsidiary items including conditions under which measurement has been carried out into one analysis file for each measurement; an icon generating section (34) configured to generate an icon indicative of the analysis file on a screen; and a main application section (31) configured to open and operate the analysis file, wherein the icon generating section (34) is operative to graph the outcome of the analysis contained in the analysis file according to a predetermined standard without starting up the main application section (31) and then display a resulting graph (G) within an icon display area (IH) for the icon indicative of the analysis file as well as to display in text form at least a part of the subsidiary items contained in the analysis file within the icon display area (IH) together with the graph (G) in a side-by-side arrangement.

6 Claims, 18 Drawing Sheets

| FILE NAME | NUMBER OF DATA ITEMS | MULTI-DATA GRAPH BITMAP | DATA INFORMATION | DATA GRAPH BITMAP | DATA |
|---|---|---|---|---|---|

FIG.12

| FILE NAME | NUMBER OF DATA ITEMS | MULTI-DATA GRAPH BITMAP | DATA D1 INFORMATION | DATA D1 GRAPH BITMAP | DATA D1 | DATA D2 INFORMATION | DATA D2 GRAPH BITMAP | DATA D2 | DATA D3 INFORMATION | DATA D3 GRAPH BITMAP | DATA D3 |
|---|---|---|---|---|---|---|---|---|---|---|---|

FIG. 13

APPARATUS AND METHOD OF CATALOGING TEST DATA BY ICONS

BACKGROUND OF THE INVENTION

1. Field of the Invention

The present invention relates to analyzers such as a particle size distribution analyzer and more particularly, an apparatus and method of cataloging test data with visual symbols.

2. Description of Related Art

In searching plural analysis files for a desired file in an analyzer (such as a particle size distribution analyzer), it is a common practice for the operator of the analyzer to retrieve the desired file by referencing the name and date of the file. However, if the operator forgets the name and date of the desired file, the operator must check whether or not each of the plural analysis files is the desired one by opening the files one by one by way of the application. Moreover, in analyzers of this type it is likely that a very large number of files have been created in a disorderly manner due to frequent measurement without being classified or sorted out. In such a case retrieval of a desired file is very difficult.

In attempt to overcome such difficulty, an invention has been made as disclosed in Japanese Patent Laid-Open Publication No. 2002-163666. According to this invention, graphs are displayed in a catalogued fashion with their sizes reduced in order to facilitate analysis file retrieval. Actually, however, the file retrieval is not very easy because the analysis files generally may include similar graphs. Further, there exists a problem in that it is difficult for an inexperienced engineer to identify each of the graphs displayed in a catalogued fashion with a corresponding file at a glance even when the graphs are not similar to each other.

Also, it is conceivable that measurements on the same subject under different conditions may provide graphs that are similar in form to each other as the outcomes of the measurements. In such a case, catalogued display of graphs cannot allow the operator to identify each of the graphs with a corresponding file and, hence, identification of a desired file need be made from the file name and date of the desired file as in the same manner as currently used. It follows that if the operator forgets the name and date of a desired file, the operator must check whether or not each one of a plurality of files is the desired one by opening the files one by one.

The invention disclosed in the aforementioned Japanese Patent Laid-Open Publication No. 2002-163666 requires an application program dedicated to the purpose of displaying graphs in a catalogued fashion. Therefore, such an inconvenience also exists in that a computer not installed with such an application program cannot retrieve a desired file.

Accordingly, there is still a need in the prior art to provide an analyzer system which is capable of retrieving a desired analysis data file quickly without starting up and enabling an entire application computer program.

SUMMARY OF THE INVENTION

In one aspect of the present invention, there is provided an analyzer comprising: a file storage section configured to store an outcome resulting from an analysis of a subject and subsidiary items including conditions under which measurement has been carried out in the analysis into an analysis file for each measurement; an icon generating section configured to generate an icon indicative of the analysis file on a screen; and a main application section configured to open and operate the analysis file, wherein the icon generating section is operative to graph the outcome of the analysis contained in the analysis file according to a predetermined standard without starting up the main application section and then display a resulting graph within an icon display area for the icon indicative of the analysis file as well as to display in text form at least a part of the subsidiary items contained in the analysis file within the icon display area together with the graph in a side-by-side arrangement.

The expression "to graph according to a predetermined standard", as used herein, is meant to draw graphs to be displayed in respective icon display areas on the same scale in terms of both the vertical axis and the horizontal axis.

The expression "to display in text form", as used herein, is meant to provide a display using letters.

The analyzer thus configured is capable of displaying a graph representing the outcome of an analysis together with subsidiary items in text form related to the analysis within a corresponding one of a plurality of icon display areas for icons, each indicative of a respective one of analysis files. Further, since the graphs, each displayed in a respective one of the icon display areas, are standardized, the operator can identify each of the files based on the positional relation among characteristic portions of respective graphs.

In another aspect of the present invention, there is provided an analyzer comprising: a file storage section configured to store an outcome resulting from an analysis of a subject and subsidiary items including conditions under which measurement has been carried out in the analysis into one analysis file for each measurement; a dialog window generating section configured to generate a dialog window for displaying file names of analysis files on a screen in a catalogued fashion; and a main application section configured to open and operate each of the analysis files, wherein the dialog window generating section is operative to graph an outcome of an analysis contained in an analysis file selected by an operator according to a predetermined standard without starting up the main application section and then display a resulting graph within a predetermined display area of the dialog window as well as to display in text form at least a part of the subsidiary items contained in the selected analysis file within the predetermined display area together with the graph.

This configuration can enjoy the same advantage as the former configuration.

In yet another aspect of the present invention, there is provided an analyzer comprising: a file storage section configured to store an outcome resulting from an analysis of a subject into an analysis file; an icon generating section configured to generate an icon indicative of the analysis file on a screen; and a main application section configured to open and operate the analysis file, wherein: the icon generating section is operative to interpret data existing in a predetermined area of the analysis file as image data and then display an image corresponding to the image data as an icon without opening the analysis file; and the file storage section is operative to store image data obtained by graphing the outcome resulting from the analysis of the subject according to a predetermined standard into the predetermined area of the analysis file.

The analyzer thus configured is capable of displaying a graph representing the outcome of an analysis in an icon display area by using general-purpose software originally installed in a computer for management of files and the like without using the main program application section configured to open and operate an analysis file. Therefore, this analyzer can retrieve a desired file quickly and hence can perform necessary operations efficiently.

For convenience of systematic arrangement of, or calculations on analysis, outcome data items obtained under the same conditions for example, it is desirable that a method wherein the file storage section can be enabled to be operative to store plural analysis data items into one analysis file and then storing image data obtained by graphing at least one of the plural analysis outcome data items according to a predetermined standard in a predetermined area of the analysis file.

For subsidiary items, characteristic of each analysis file to be displayed in the icon display area or in the predetermined display area of the dialog window, it is desirable that the analyzer allows an operator to select subsidiary items to be displayed and then rearrange the selected subsidiary items.

In a desirable one of the specific embodiments, the analyzer is a particle size distribution analyzer wherein the subject is particles dispersed in a dispersing medium and a particle size distribution of the particles is measured based on diffracted and/or scattered of light obtained by irradiating light to particles.

Thus, the present invention makes it possible to provide an analyzer system and method which is capable of displaying a graph representing the outcome of an analysis together with information in text form related to the analysis within a corresponding one of icon display areas for icons, each indicative of a respective one of analysis files or within the predetermined display area of the dialog window, as well as an analyzer which is capable of displaying a graph representing the outcome of an analysis in an icon display area by using general-purpose software originally installed in a computer for management of files and the like without using a dedicated application program which is further configured to open and operate an analysis file. Therefore, each of these analyzers can retrieve a desired file quickly and hence can perform necessary operations efficiently.

The foregoing and other features and attendant advantages of the present invention will become more apparent from the reading of the following detailed description of the invention in conjunction with the accompanying drawings.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 12 is an illustration of the data structure of an analysis file according to the third embodiment;

FIG. 13 is an illustration of the data structure of an analysis file according to the third embodiment;

DETAILED DESCRIPTION OF THE PREFERRED EMBODIMENTS

Reference will now be made in detail to the preferred embodiments of the invention which set forth the best modes contemplated to carry out the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Preferred embodiments of the present invention will now be described in detail with reference to the accompanying drawings.

Figure 1:
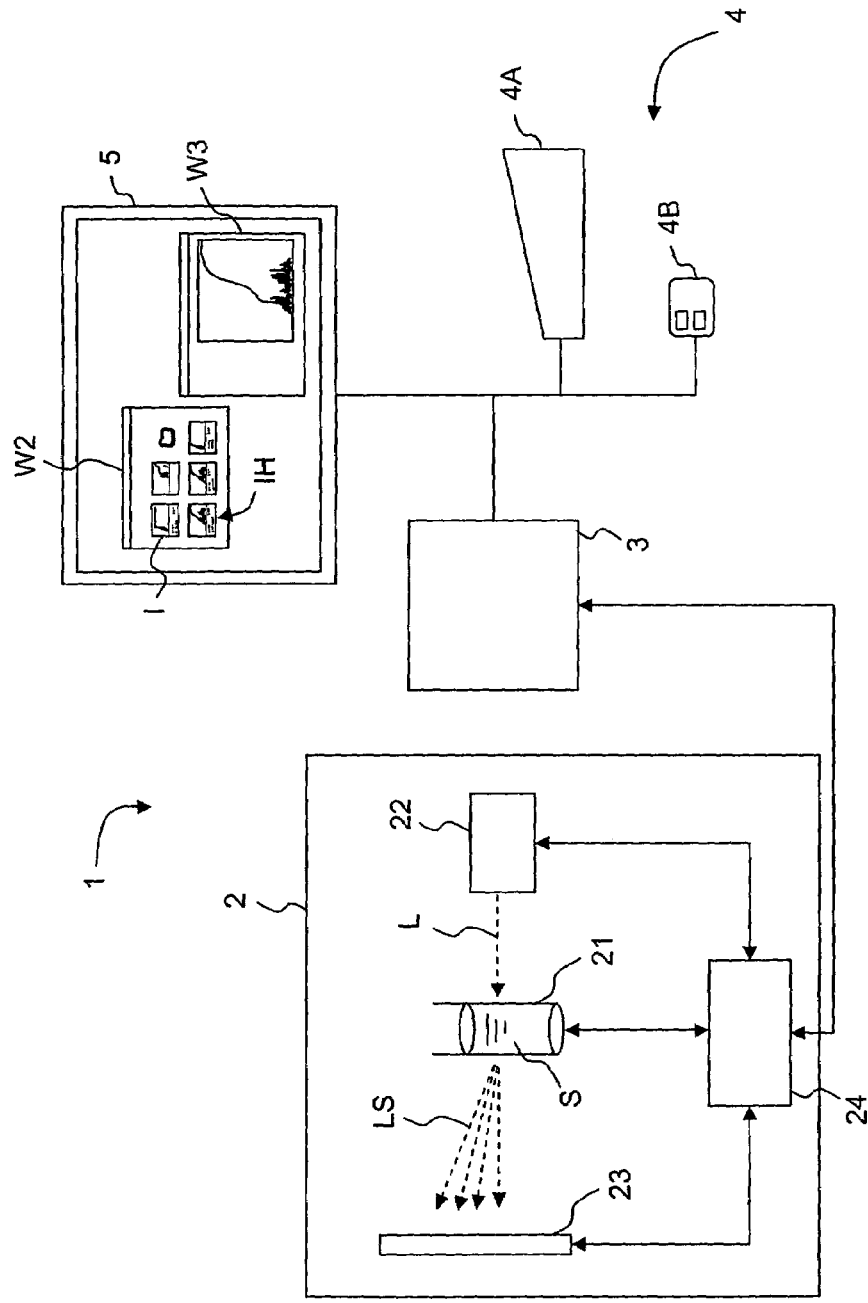
FIG. 1 is a diagram schematically showing the configuration of a particle size distribution analyzer according to a first embodiment of the present invention.

In a first embodiment, the present invention is applied to a particle size distribution analyzer, system and method. Referring to FIG. 1, particle size distribution analyzer 1 according to this embodiment includes a measuring section 2 configured to measure the particle size distribution of the particles S as a subject to be analyzed, and an information processing apparatus 3 connected to the measuring section 2.

The measuring section 2 comprises a cell 21 containing the particles S dispersed in a dispersing medium such as water or air, a light source 22 for irradiating the particles S with laser light L, a photo-detector 23 configured to detect diffracted and/or scattered light LS produced from the particles S irradiated with laser light L, and a control section 24 configured to control the components forming the measuring section 2 such as the cell 21, light source 22 and photo-detector 23.

The cell 21 is a transparent cell formed from a transparent material such as glass or a plastic resin and is capable of containing a sample comprising the particles S dispersed in the dispersing medium. The cell 21 is removably mounted at a predetermined position by means of a non-illustrated cell holder.

The light source 22 is of a known type configured to emit laser light L, which is coherent light.

The photo-detector 23 comprises a transmitted light detector configured to detect the intensity of transmitted light LS having passed through the cell 21, and a plurality of scattered light detectors positioned and configured to detect an intensity distribution of scattered light LS produced from the particles S irradiated with laser light L.

The control section 24 controls the operations of the components including the cell 21, light source 22 and photo-detector 23 in response to control signals for controlling the measuring section 2 received from the information processing apparatus 3. Also, the control section 24 receives a light intensity signal from the photo-detector 23 and then outputs the signal to the information processing apparatus 3.

Figure 2:
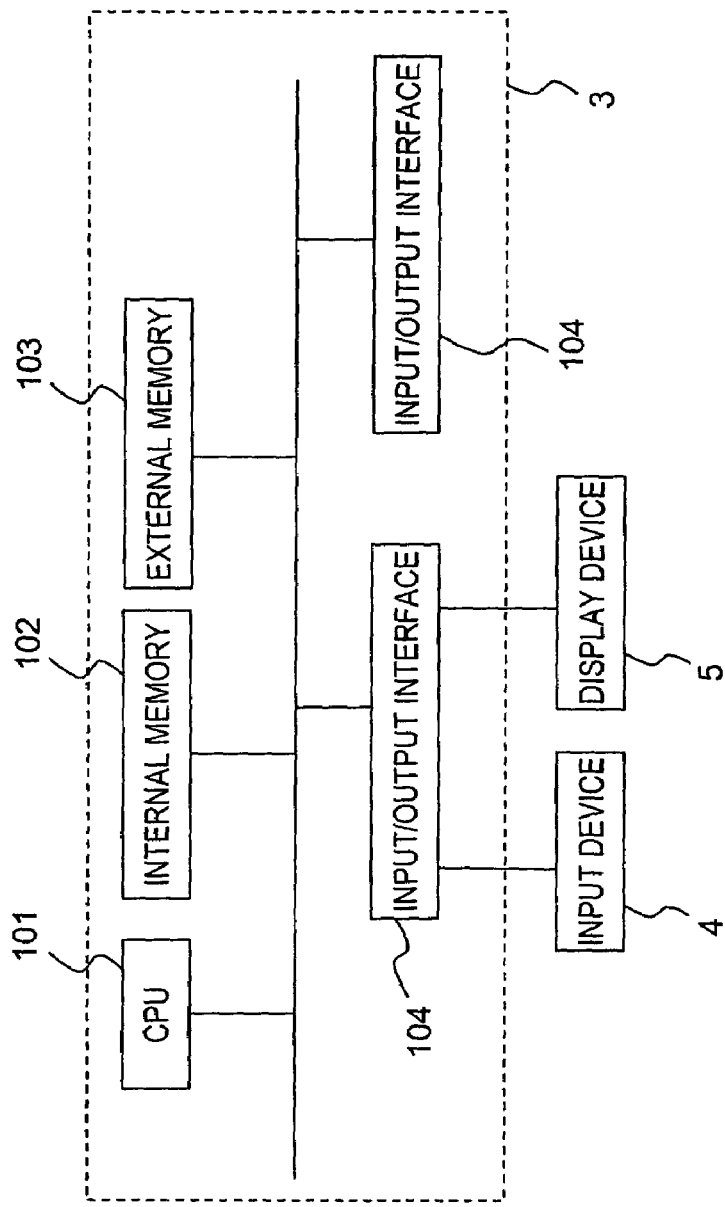
FIG. 2 is a block diagram showing the device configuration of an information processing apparatus used in the first embodiment.
Figure 3:
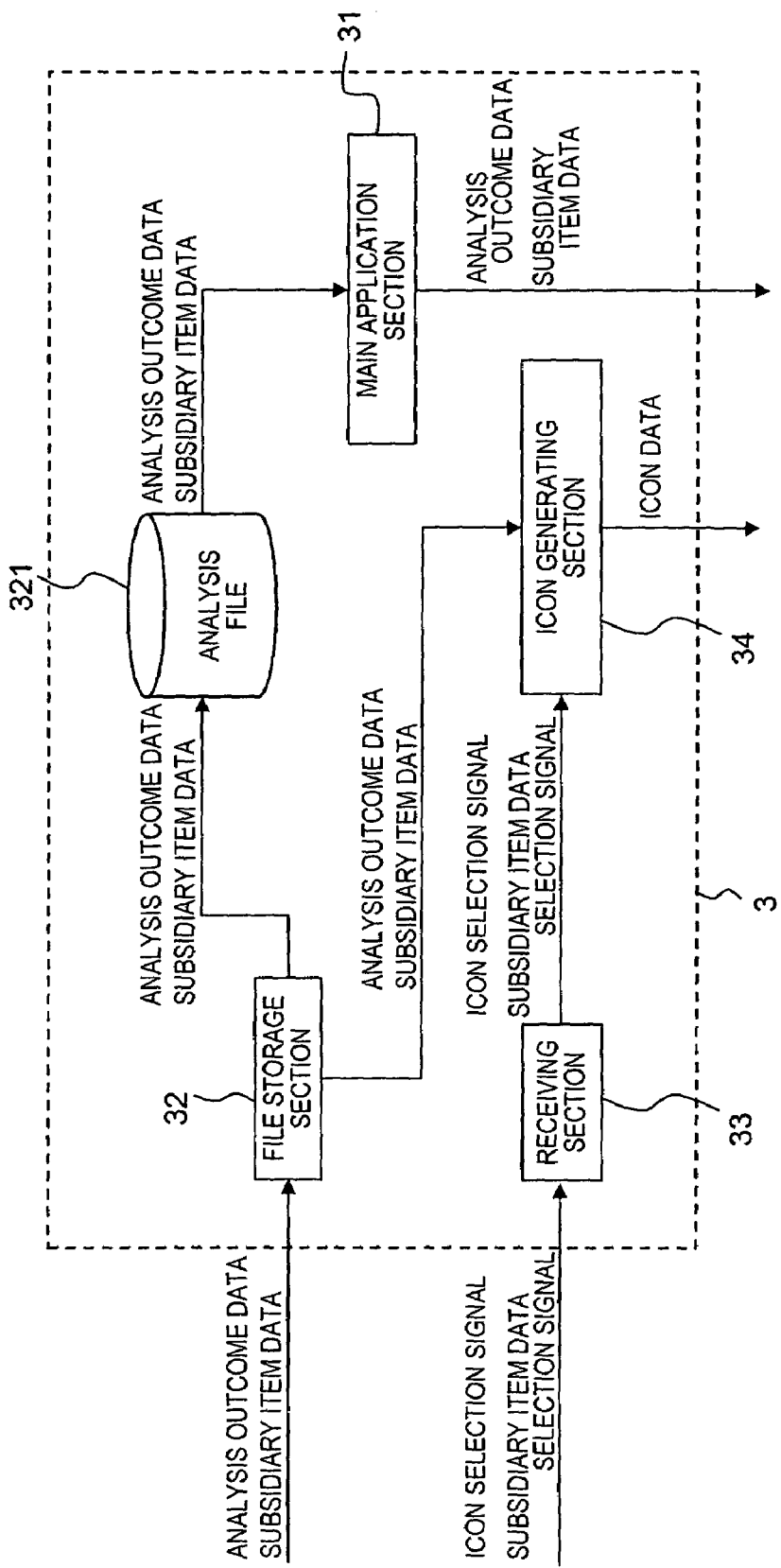
FIG. 3 is a block diagram showing the functional configuration of the information processing apparatus used in the first embodiment.

The information processing apparatus 3 outputs control signals to the control section 24 for controlling the measuring section 2 while processing the light intensity signal received from the control section 24 to calculate the particle size distribution of the particles S. The information processing apparatus 3 is connected to an input device 4 comprising a keyboard 4A and a mouse 4B for receiving inputs from the operator, e.g., an operator input control unit and to an output device comprising a graphic display as a display device 5 and a non-illustrated printer. The information processing apparatus 3 is a general-purpose or customized computer including a CPU 101, memory 102, memory 103, an input/output interface 104, and other components, as shown in FIG. 2. The CPU 101 cooperates with peripheral devices and the like according to an application program stored in a predetermined area of the memory 102 or 103 so that the information processing apparatus 3 functions as a main application section 31, a file storage section 32, a receiving section 33, an icon generating section 34, and the like as shown in FIG. 3.

The main application section 31 is configured to access and open an analysis file 321 and display or operate it according to an instruction from the operator.

The file storage section 32 is configured to store analysis outcome data obtained from an analysis of the particles S and subsidiary item data on subsidiary items including the conditions under which measurement has been conducted in that analysis into one analysis file 321 for each analysis.

The receiving section 33 receives a subsidiary item data selection signal inputted from the operator for selecting a subsidiary item T to be displayed in text form within an icon display area IH from the subsidiary item data stored in the analysis file 321. Also, the receiving section 33 is capable of receiving a subsidiary item data change signal for changing the subsidiary item T to be displayed within the icon display area IH to another one.

The icon generating section 34 generates an icon I indicative of analysis file 321 on the screen. Specifically, the icon generating section 34 obtains analysis outcome data and subsidiary item data stored in each analysis file 321 from the file storage section 32, graphs the analysis outcome data according to a predetermined standard without starting up the main application section 31, and then displays the resulting graph within the icon display area IH for the icon I indicative of the analysis file 321. At the same time therewith, the icon generating section 34 displays in text form a specific subsidiary item selected from the subsidiary item data by a subsidiary item data selection signal within the display area IH together with the graph G in a side-by-side arrangement. Although in the configuration shown in FIG. 3 the icon generating section 34 obtains the analysis outcome data and the subsidiary item data from the file storage section 32, it is needless to say that such data may be obtained from the analysis file 321.

In addition, in response to a predetermined input (right-clicking by the mouse for example) to plural icons I selected arbitrarily by the operator, the icon generating section 34 can display a new screen displaying only those icons I.

Though the present embodiment is configured to divide the icon display area IH vertically into two areas, the upper area displaying the standardized graph G, the lower area displaying the subsidiary item T selected by the operator, the graph G and the subsidiary item T may be displayed in any manner as long as they are within the icon display area IH.

Further, the icon generating section 34 is capable of changing the contents displayed by the icon I according to a data change signal received by the receiving section 33.

Figure 4:
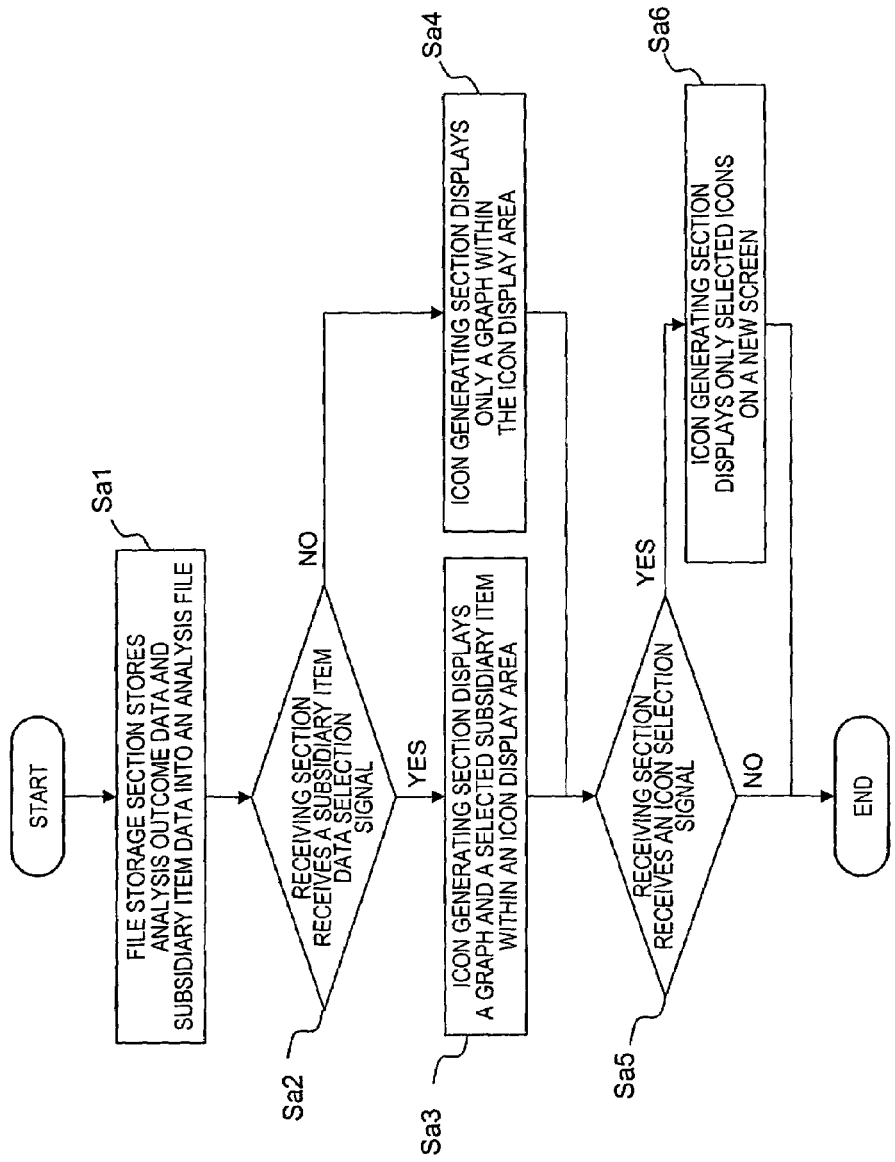
FIG. 4 is a processing flowchart of a screen display operation of the particle size distribution analyzer according to the first embodiment.

The icon display operation of the present embodiment thus configured will be described with reference to the flowchart at FIG. 4.

Initially, the file storage section 32 receives analysis outcome data on the outcome of an analysis and subsidiary item data on subsidiary items including measuring conditions to store them in one analysis file 321 for each measurement (step Sa1.)

Subsequently, the operator selects a subsidiary item T to be displayed in text form within an icon display area IH from the subsidiary items including measuring conditions and then input the selected subsidiary item T by the input device 4.

Then, the receiving section 33 receives a subsidiary item data selection signal inputted by the input device 4 (step Sa2.)

Figure 5:
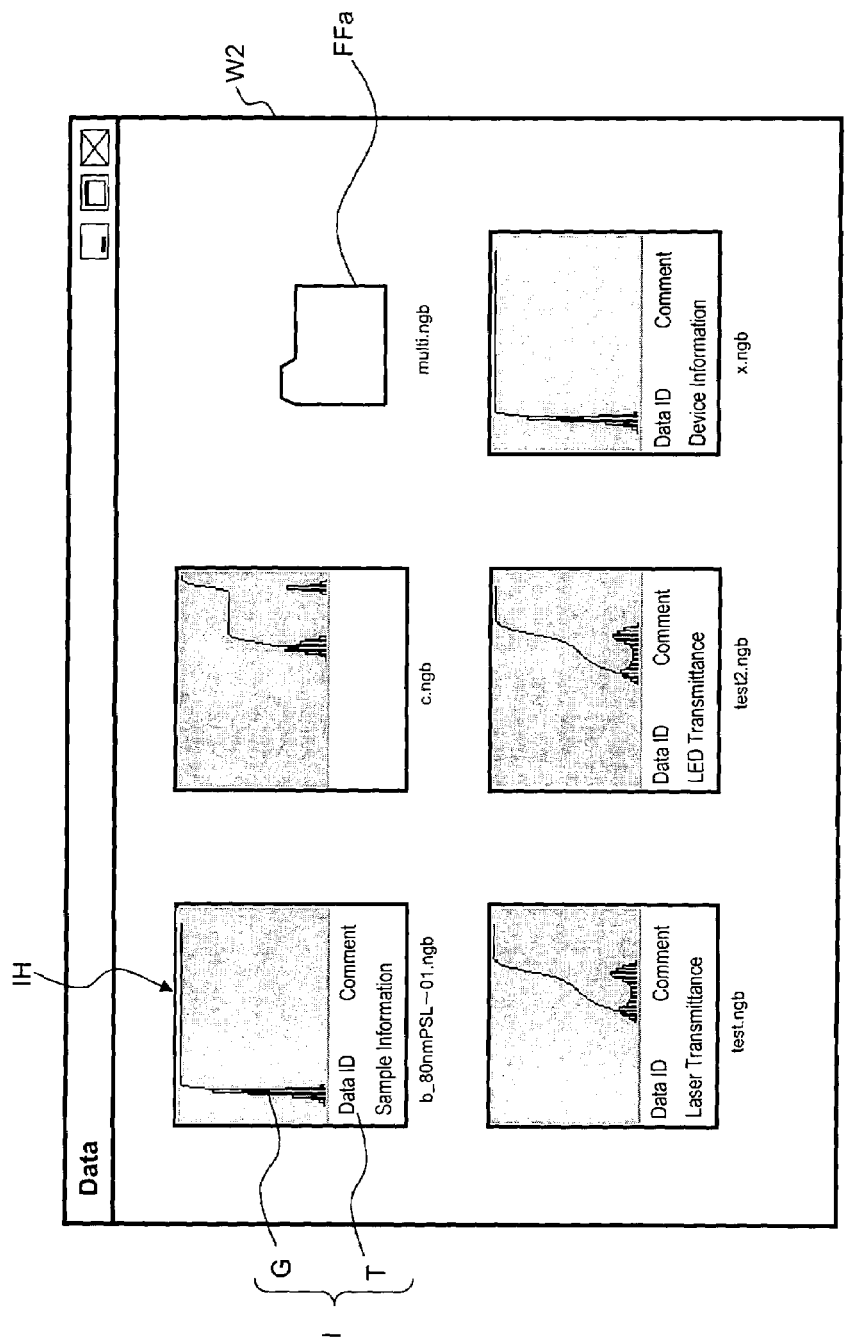
FIG. 5 is an illustration of catalogued display of icons in a window according to the first embodiment.

In turn, the icon generating section 34 analyzes the outcome of the analysis, draws a standardized graph G representing the outcome of the analysis and displays the graph G together with the subsidiary item T in text form selected by the subsidiary item data selection signal in a side-by-side arrangement within the icon display area IH, as shown in FIG. 5 (step Sa3.)

If the receiving section 33 does not receive the subsidiary item data selection signal from the operator, the icon generating section 34 displays only the standardized graph G within the icon display area IH (step Sa4.)

When the operator selects plural icons I and performs a predetermined action (right-clicking for example) thereon, the receiving section 33 receives an icon selection signal corresponding to that selection (step Sa5) and then the icon generating section 34 displays only the selected icons I on a new screen (step Sa6.)

If the operator selects a desired icon I and performs a predetermined action (double-clicking for example) thereon in any one of the steps Sa3, Sa4 and Sa6, the main application section 31 starts up to open the analysis file 321 selected by the operator.

The following description is directed to a specific example of display on the screen.

Here, consideration will be given to a case where plural analysis files 321 are stored in one file folder FF (folder name: Data for example.)

Figure 6:
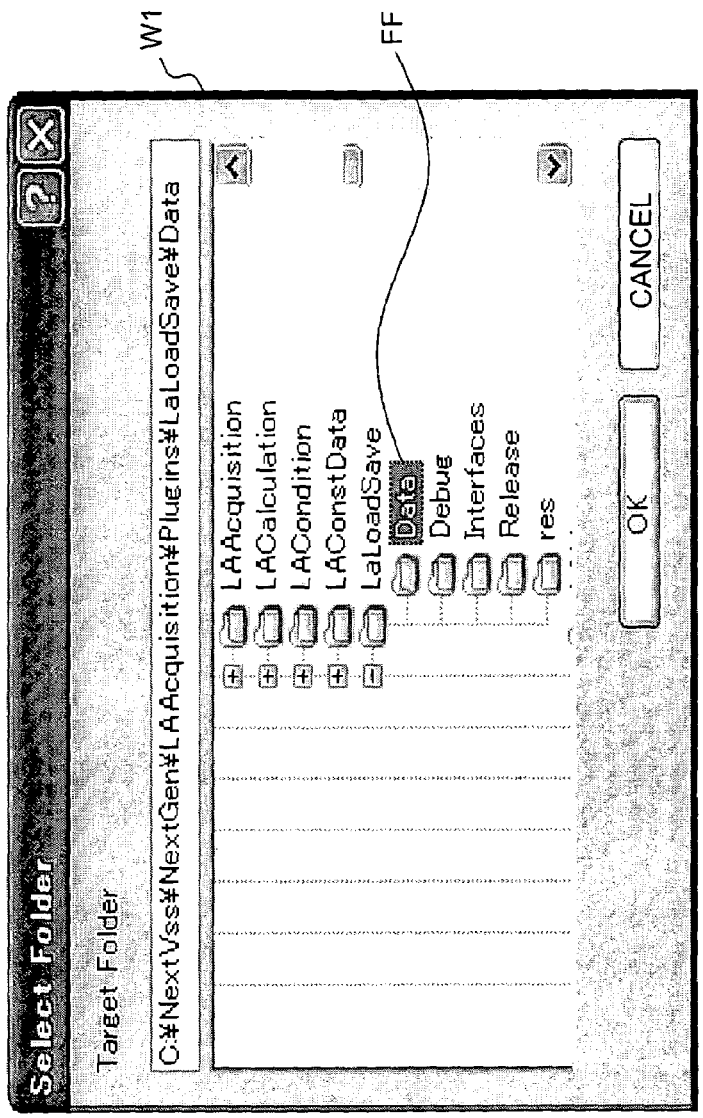
FIG. 6 is an illustration of a folder selection window according to the first embodiment.

When the file folder FF is selected in a folder selection window W1 shown in FIG. 6, a file folder window W2 for the file folder FF is opened. Then, icons I each indicative of a respective one of all the files 321 stored in the file folder FF are displayed in the window W2 in a catalogued fashion, as shown in FIG. 5.

In this embodiment an analysis file FFa is stored in the file folder FF. Plural analysis data items are stored in the single analysis file FFa. An icon indicative of the analysis file FFa is displayed like a folder icon together with the catalogued icons I, as shown in FIG. 5. When the analysis file FFa (file name: multi.ngb) is selected, the icon generating section 34 displays icons I indicative of all the analysis data items stored in the analysis file FFa on a new screen in a catalogued fashion. The manner in which the icons I belonging to the analysis file FFa are displayed is only one illustrative example. Graphs G of icons I may be divided into plural groups, and the plural analysis data items stored in the analysis file FFa may be displayed as graphs individually or any desired one of the plurality of analysis data items may be displayed as a graph.

Figure 7:
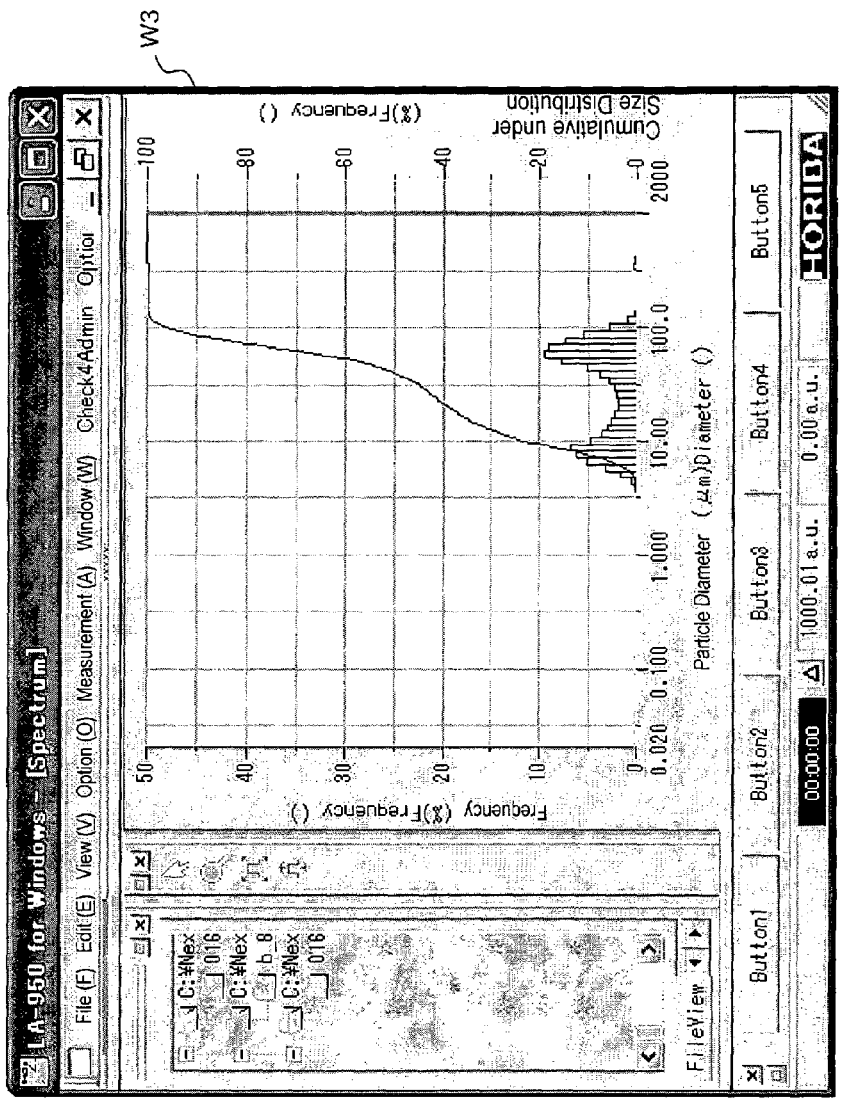
FIG. 7 is an illustration of a window displaying an analysis file opened by way of an application.

Subsequently, when a displayed icon I (file name: test.ngb, for example) is clicked on or dragged and dropped, the main application section 31 starts up to open one selected file 321 in another window 3, as shown in FIG. 7.

Specific examples of subsidiary items to be displayed within icon display area IH include a file name, data ID, date and time of measurement, laser transmittance, LED transmittance, refractive index file name, sample information, device information, number of integrations, median diameter, P.S. area, mean diameter, standard deviation, variance, coefficient of variation, mode diameter, span, arithmetic mean diameter, arithmetic standard deviation, arithmetic variance, chi-square, residual R parameter, cumulative on particle size, and particle size on cumulative. Conceivable graphs G to be displayed within icon display area IH include a graph representing a measuring condition in addition to a graph representing the outcome of an analysis.

As described above, the particle size distribution analyzer 1 according to the present embodiment is capable of displaying a standardized graph G representing the outcome of an analysis and information T in text form related to the analysis within an icon display area IH for an icon indicative of a respective one of analysis files 321. Thus, the analyzer 1 can retrieve a desired file 321 quickly and hence can perform necessary operations efficiently.

A second embodiment of the present invention will be described with reference to the drawings. Like reference characters are used to designate like or corresponding parts throughout the first and second embodiments.

Figure 8:
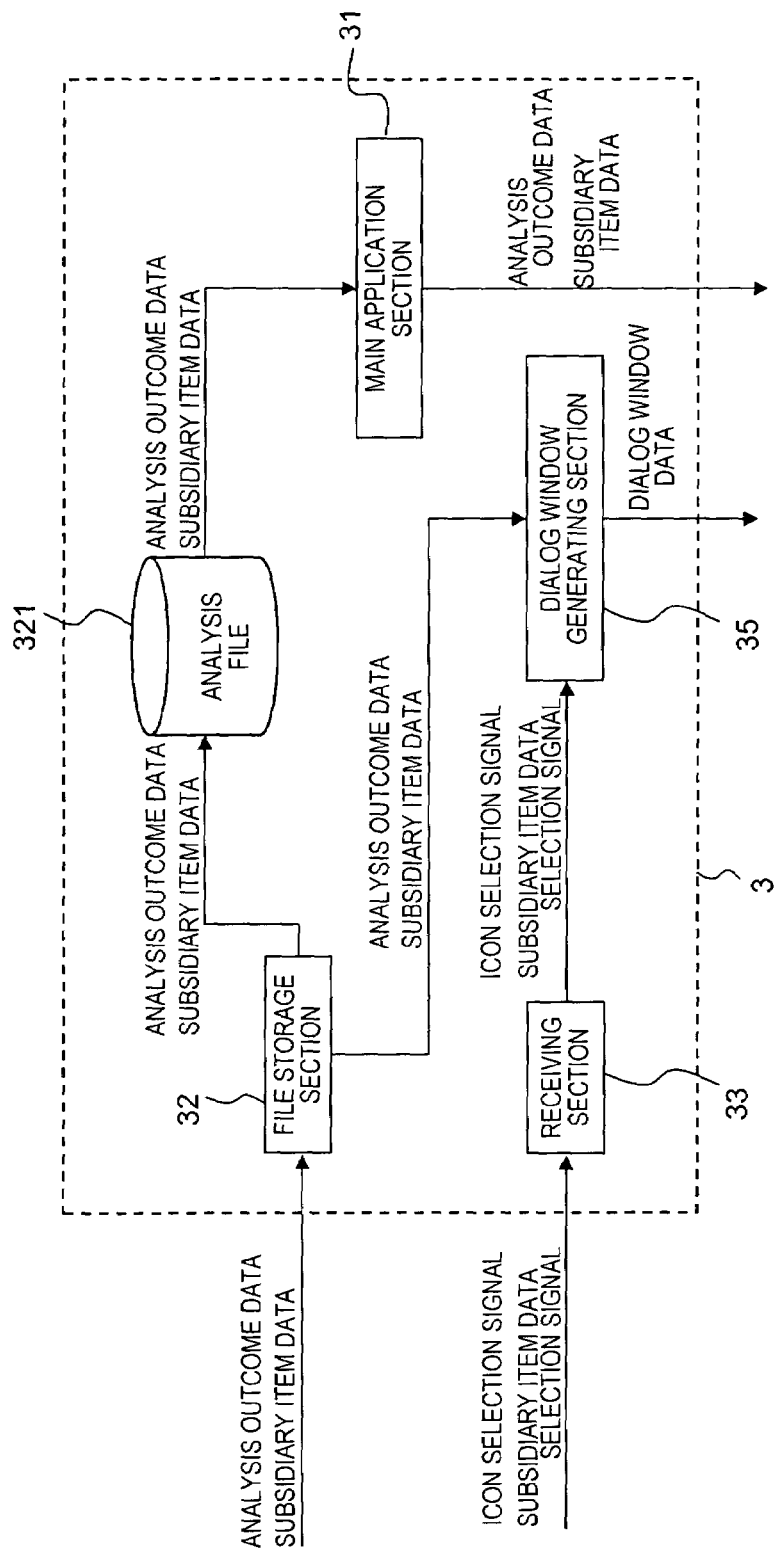
FIG. 8 is a block diagram showing the functional configuration of an information processing apparatus used in a second embodiment of the present invention.

Particle size distribution analyzer 1 according to this embodiment is substantially similar to the first embodiment in the basic configurations of respectively the measuring section 2 and the information processing apparatus 3 but is different therefrom in that the second embodiment includes a dialog window generating section 35 instead of the icon generating section 34, as shown in FIG. 8.

The dialog window generating section 35 displays the file names of analysis files 321 on a screen in a catalogued fashion. Specifically, the dialog window generating section 35 obtains analysis outcome data and subsidiary item data stored in an analysis file 321 selected by the operator from the file storage section 32, graphs the analysis outcome data according to a predetermined standard without starting up the main application section 31, and then displays the resulting graph within a predetermined display area of a dialog window W4. At the same time therewith, the dialog window generating section 35 displays in text form at least a part of the subsidiary items contained in the analysis file 321 within the predetermined display area of the dialog window W4 together with the graph G in a side-by-side arrangement. Although in the configuration shown in FIG. 8 the dialog window generating section 35 obtains the analysis outcome data and the subsidiary item data from the file storage section 32, it is needless to say that such data may be obtained from the analysis file 321.

The present embodiment is configured to have the predetermined display area in a lower portion of the dialog window and display the standardized graph G on the right-hand side of the predetermined display area and the operator's selected subsidiary items T at a location adjacent (or on the left-hand side of) the graph G.

Figure 9:
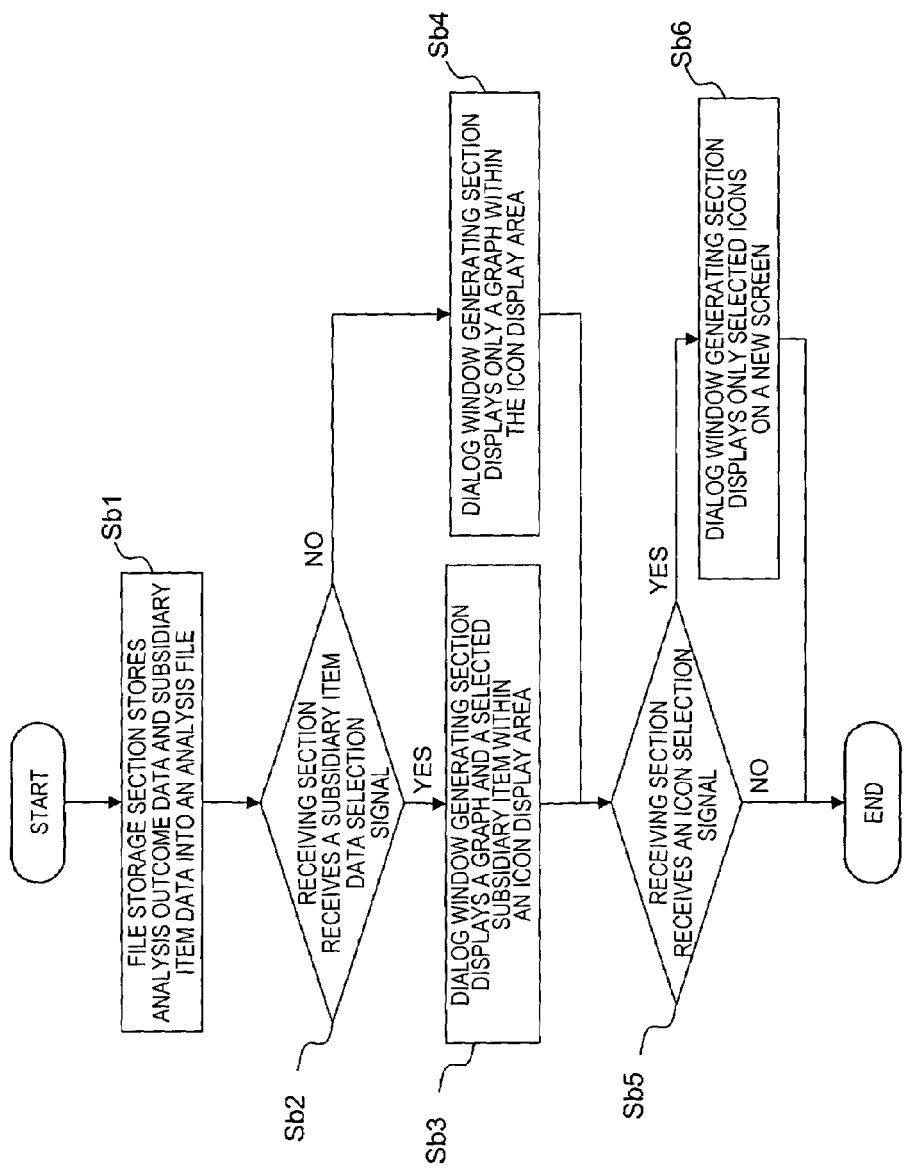
FIG. 9 is a processing flowchart of a screen display operation of a particle size distribution analyzer according to the second embodiment.

The dialog window display operation of the present embodiment thus configured will be described with reference to the flowchart at FIG. 9.

Initially, the file storage section 32 receives analysis outcome data on the outcome of an analysis and subsidiary item data on subsidiary items including measuring conditions and stores them into one analysis file 321 for each measurement (step Sb1.)

Subsequently, the operator selects a subsidiary item T to be displayed in text form within the predetermined display area of the dialog window W4 from the subsidiary items including measuring conditions and then inputs the selected subsidiary item T by the input device 4.

Then, the receiving section 33 receives a subsidiary item data selection signal inputted by the input device 4 (step Sb2.)

Figure 10:
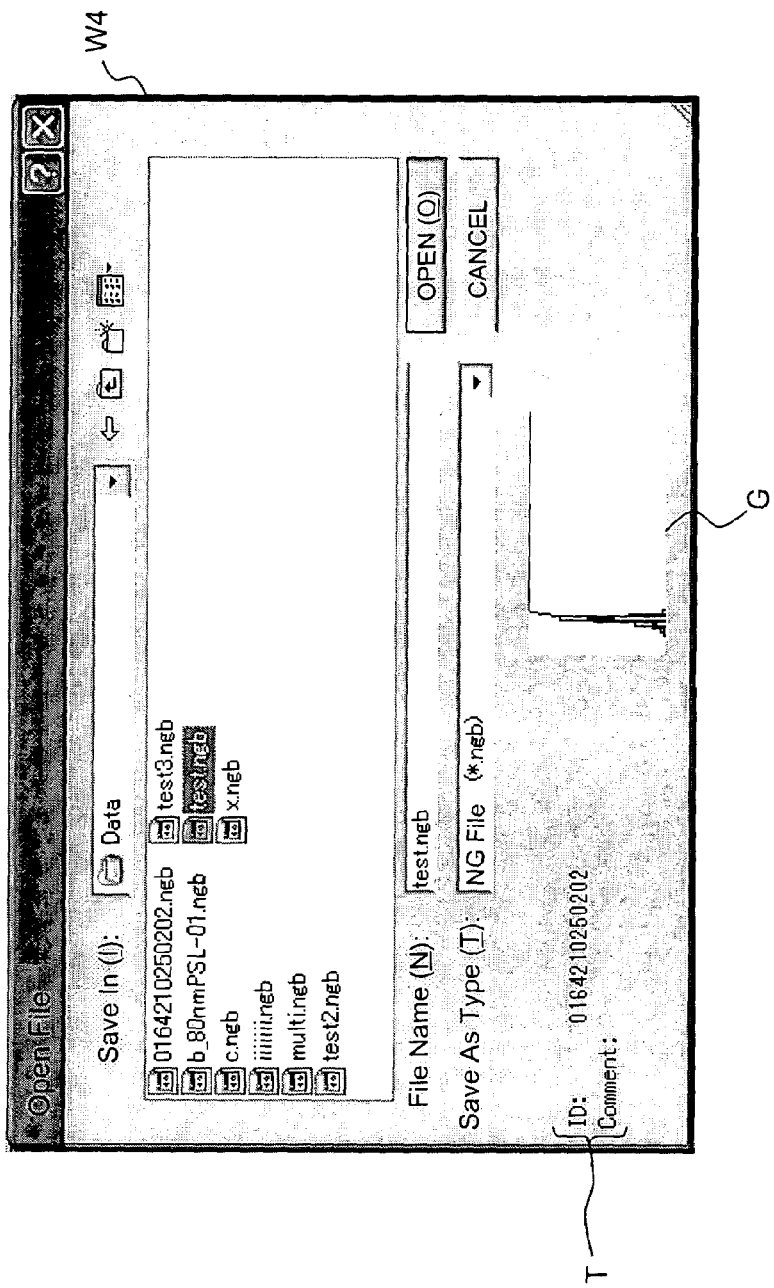
FIG. 10 is an illustration of a dialog window according to the second embodiment.
Figure 11:
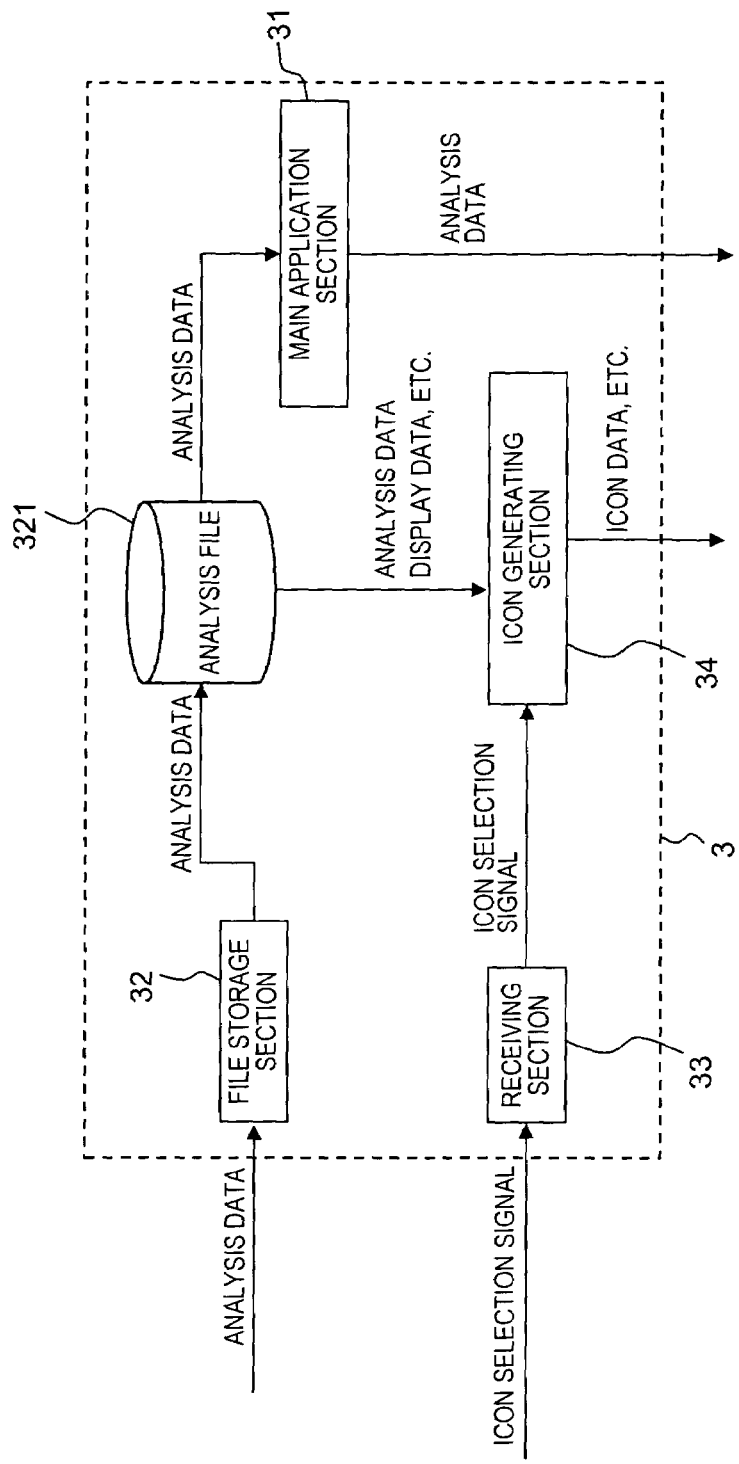
FIG. 11 is a block diagram showing the functional configuration of an information processing apparatus used in a third embodiment of the present invention.

In turn, the dialog window generating section 35 analyzes the outcome of the analysis, draws a standardized graph G representing the outcome of the analysis and displays the graph G together with the subsidiary item T in text form selected by the subsidiary item data selection signal in a side-by-side arrangement within the predetermined display area, as shown in FIG. 10 (step Sb3.)

If the receiving section 33 does not receive the subsidiary item data selection signal from the operator, the dialog window generating section 35 displays only the standardized graph G within the predetermined display area (step Sb4.)

When the operator selects plural files and performs a predetermined action (right-clicking for example) thereon, the receiving section 33 receives a file selection signal corresponding to that selection (step Sb5) and then the dialog window generating section 35 displays only the selected files 321 on a new screen (step Sb6.)

If the operator selects a desired icon I and performs a predetermined action (double-clicking for example) thereon in any one of the steps Sb3, Sb4 and Sb6, the main application section 31 starts up to open the analysis file 321 selected by the operator.

The following description is directed to a specific example of display on a screen.

Here, consideration will be given to a case where plural analysis files 321 are stored in one file folder FF (folder name: Data, for example.)

When the file folder FF is selected in a folder selection window W1 shown in FIG. 6, a dialog window W4 for the file folder FF is opened. Then, all the file names stored in the file folder FF are displayed in the window W4 in a catalogued fashion, as shown in FIG. 10. If the operator selects a file 321 under the file name: test.ngb, standardized graph G and selected subsidiary item T contained in that file are displayed.

As described above, the particle size distribution analyzer 1 according to the present embodiment is capable of displaying a standardized graph G representing the outcome of an analysis and information T in text form related to the analysis within the predetermined display area of a dialog window W4 corresponding to a respective one of analysis files 321. Thus, the analyzer 1 can retrieve a desired file 321 quickly and hence can perform necessary operations efficiently.

A third embodiment of the present invention will be described with reference to the drawings. Like reference characters are used to designate like or corresponding parts throughout the first to third embodiments.

Particle size distribution analyzer 1 according to this embodiment is substantially similar to the first embodiment in the basic configuration of the measuring section 2 but is different therefrom in that: the application program stored in the information processing apparatus 3 has functions as the file storage section 32 and the main application section 31 only and the icon generating section 34 is separated from the application program.

The icon generating section 34 according to the present embodiment is a general-purpose program, such as Windows Explorer, contained in an OS (for example Windows) for managing files and folders. The icon generating section 34 displays image data stored in an analysis file 321 within an icon display area IH for an icon I indicative of that analysis file 321 based on a data structure determined by the icon generating section 34 without starting up the main application section 31.

The file storage section 32 stores analysis outcome data resulting from an analysis of the particles S as a subject for analysis and subsidiary item data on subsidiary items including conditions under which measurement has been carried out in that analysis into an analysis file 321 so that analysis data including the analysis outcome data and the subsidiary item data has a predetermined data structure determined by Widows Explorer serving as the icon generating section 34.

Specifically, the file storage section 32 stores analysis data so that the analysis data has a data structure as shown in FIG. 12 or 13. Here, FIG. 12 illustrates a data structure employed when one analysis data item is to be stored into one file 321, while FIG. 13 illustrates a data structure employed when plural (three in FIG. 13) analysis data items are to be stored into one file 321.

The area "file name" stores therein data on a file name inputted by the operator for example.

The area "number of data items" stores therein display data for displaying all the graphs G representing respective analysis outcomes as analysis data stored in a file 321 in separate windows when the operator selects an icon I indicative of that file 321 and performs a predetermined action thereon, and display data for displaying only selected icons I on a new screen when the operator selects those icons I and performs a predetermined action (right-clicking for example) thereon. The area "number of data items" further stores therein data on the number of analysis data items stored in the file 321, data on forms of icons I, and other data. If plural analysis data items are stored in the file 321, the area "number of data items" may store therein display data for displaying a representative of graphs G each representing a respective one of analysis outcomes contained in the analysis data items or display data for displaying graphs G representing a predetermined number of analysis data items selected from the plural analysis data items, in accordance with the settings established by the operator.

The area "multi-data graph BITMAP" stores therein data on a standardized graph G representing the outcome of an analysis contained in analysis data stored in an analysis file 321. In the case where the analysis file 321 has plural analysis data items stored therein, it is possible to display graphs G each representing a respective one of analysis data items in a predetermined number in the display area of icon I and, hence, the area "multi-data graph BITMAP" stores therein graphs G to be displayed actually.

The area "multi-data graph BITMAP" stores therein data obtained by graphing the outcome of an analysis contained in analysis data according to a predetermined standard.

The area "data graph BITMAP" stores therein data obtained by graphing an analysis outcome contained in the analysis data.

The area "data information" stores therein display data for displaying a predetermined subsidiary item T when, for example, the operator selects an icon I and performs a predetermined action (right-clicking for example) thereon, and subsidiary item data on subsidiary items T to be displayed, and other data. The area "data information" may further store therein display data for displaying a predetermined subsidiary item T when for example the operator moves the cursor to an icon I.

The area "data" stores therein all the data items on analyses including analysis data to be processed by the main application section 31.

Figure 14:
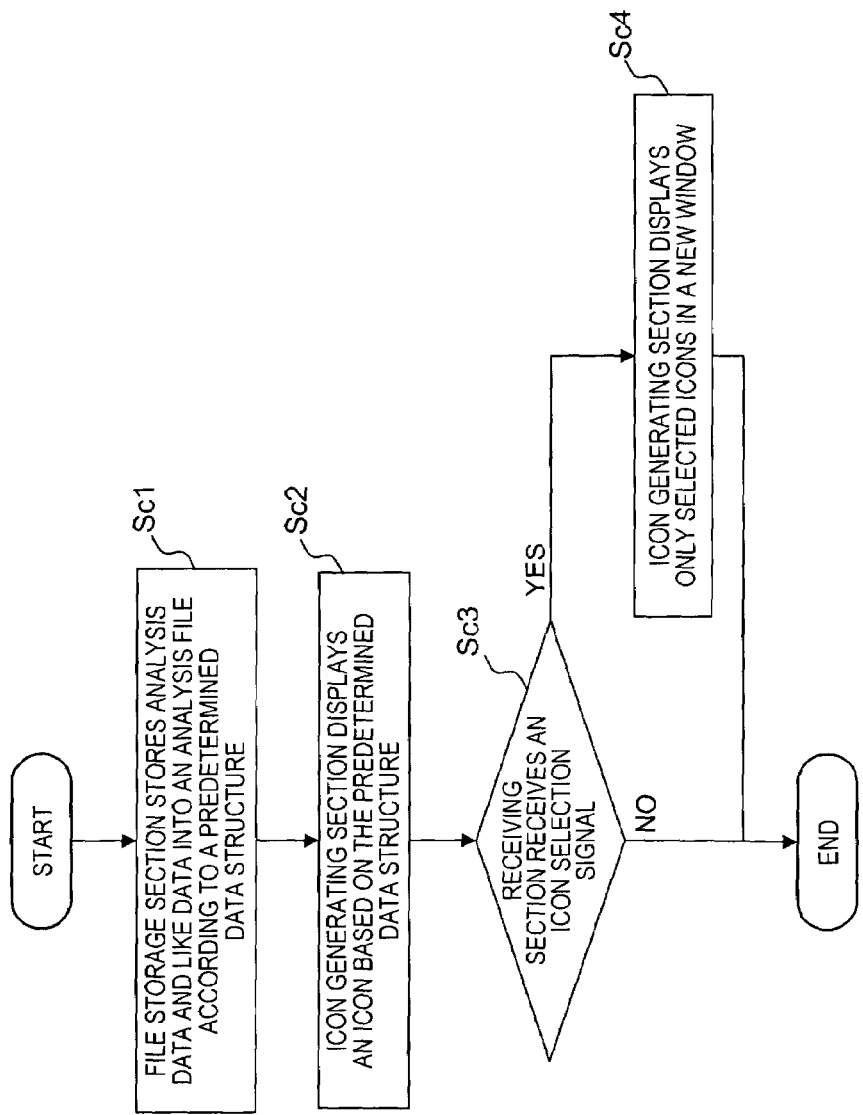
FIG. 14 is a processing flowchart of a screen display operation of a particle size distribution analyzer according to the third embodiment.
Figure 15:
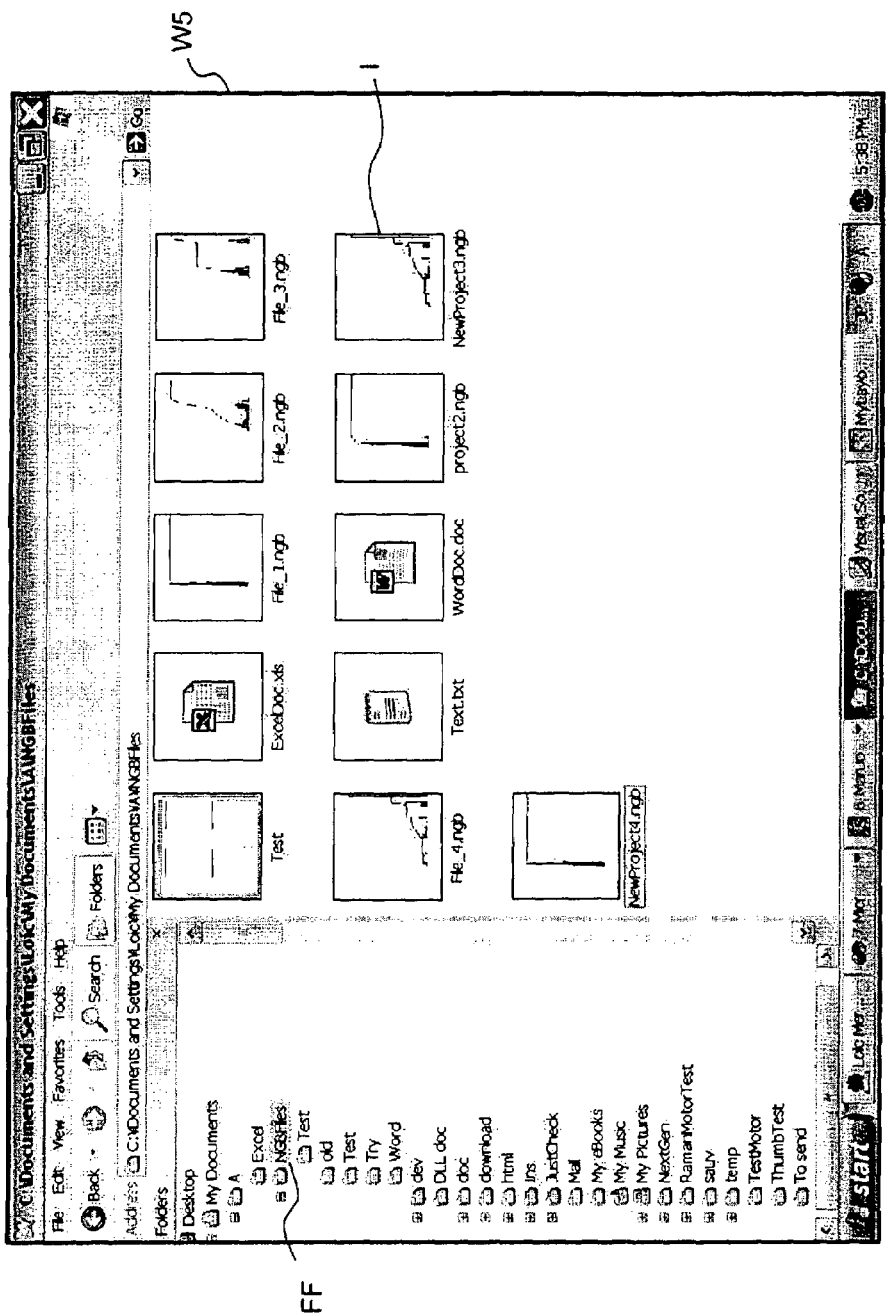
FIG. 15 is an illustration of catalogued display of icons in a window according to the third embodiment.
Figure 16:
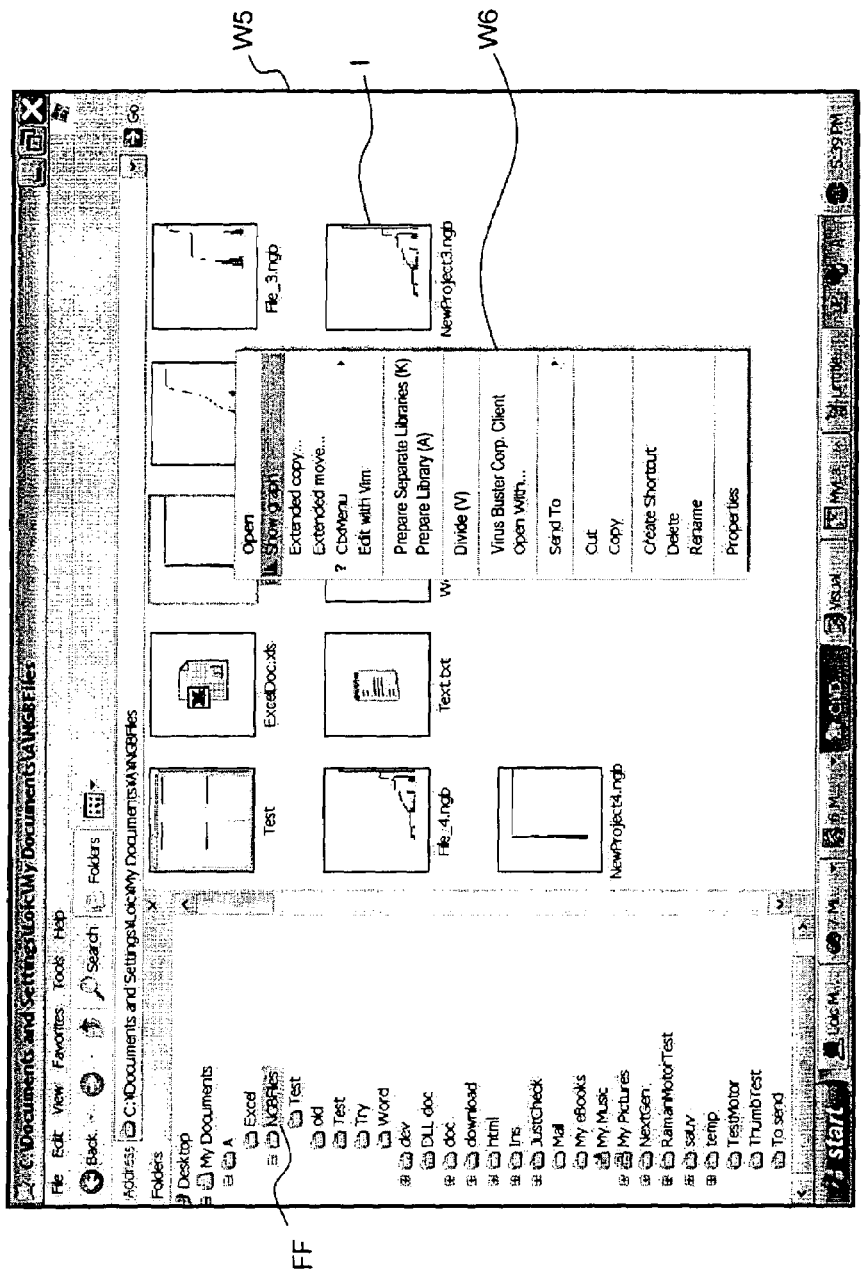
FIG. 16 is an illustration of a small window displayed according to the third embodiment.

The icon display operation of the present embodiment thus configured will be described with reference to the flowchart at FIG. 14.

Initially, the file storage section 32 receives analysis data and then stores it into an analysis file 321 so that the analysis data has the aforementioned data structure (step Sc1.)

Subsequently, when the operator starts up Windows Explorer serving as the icon generating section 34 to select a desired folder FF (NGBFiles in this embodiment), the icon generating section 34 interprets the data structure stored in the analysis file 321, recognizes a predetermined area of the data structure, i.e., the aforementioned area "multi-data graph BITMAP" as image data, and displays an image corresponding to the image data as an icon I. That is, this embodiment is configured to display a catalog of icons I each in the form of a graph obtained from the outcome of an analysis according to the predetermined standard (step Sc2.)

Figure 17:
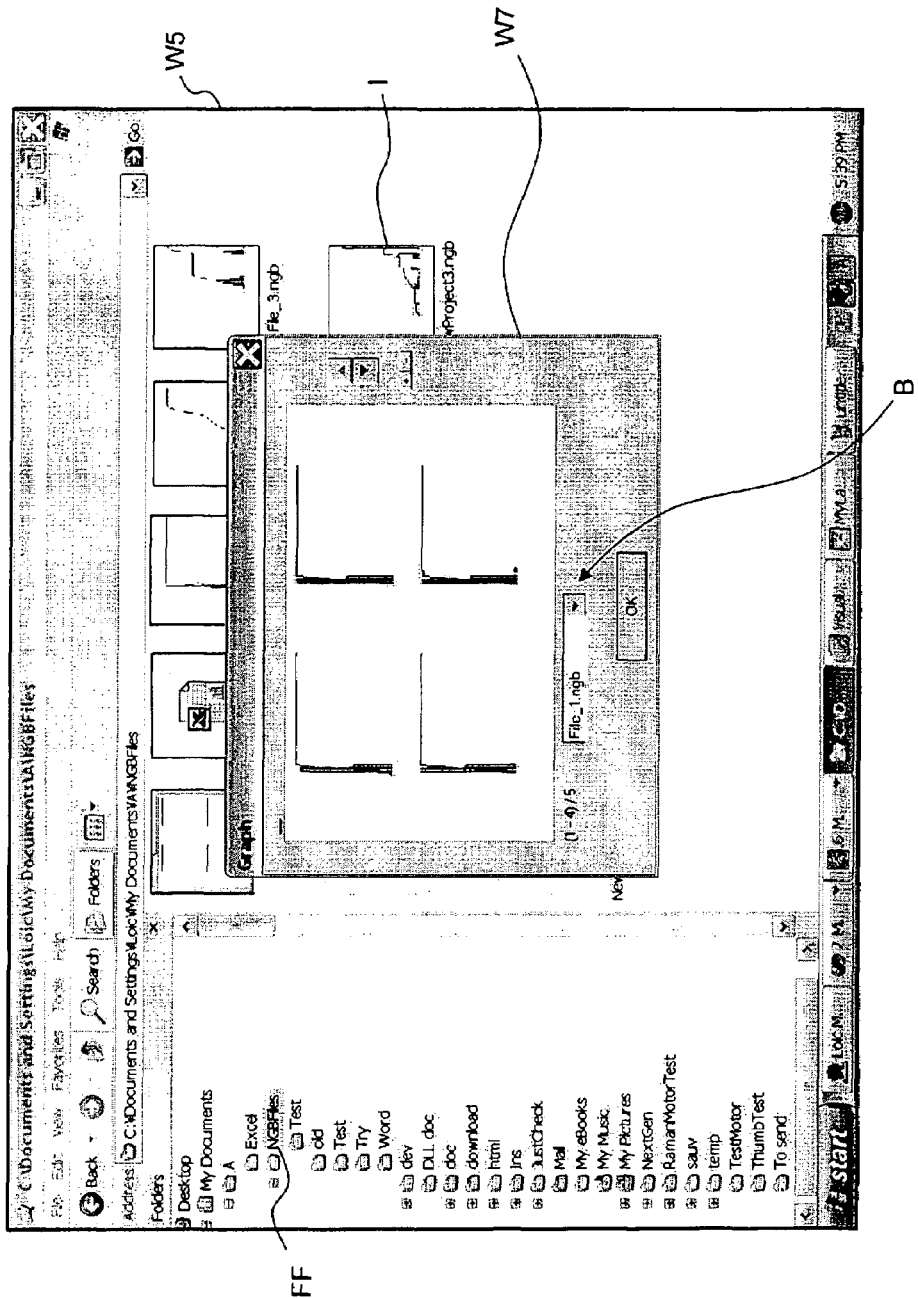
FIG. 17 is an illustration of catalogued display of graphs according to the third embodiment.
Figure 18:
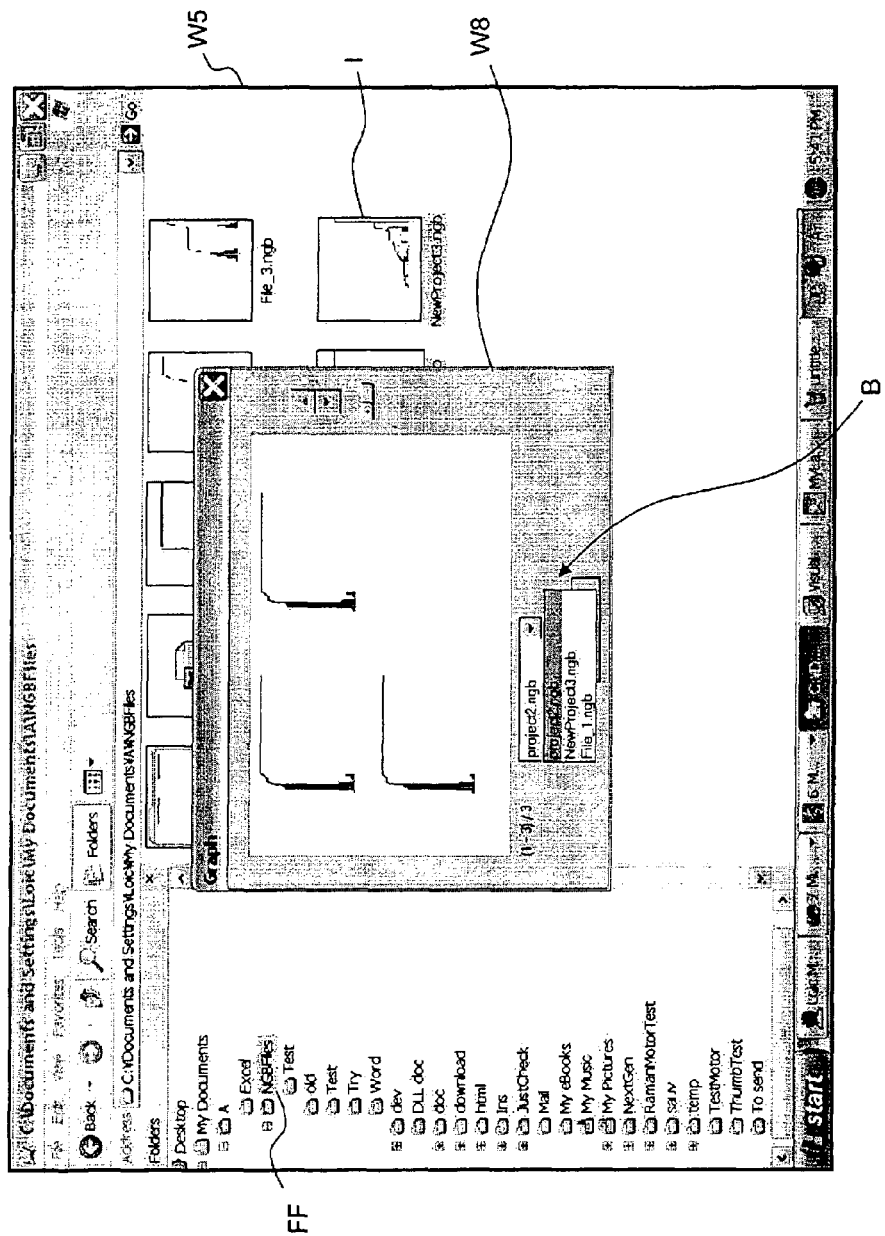
FIG. 18 is an illustration of catalogued display of graphs according to the third embodiment.

When the operator selects a predetermined icon I (file name: Test) and performs a predetermined input action (for example right-clicking with mouse) thereon, the receiving section 33 receives a corresponding input signal and opens a small window W6 in a region adjacent the icon I selected by the icon generating section 34 or in another region. Further, when the item "show graph" in the small window W6 is selected, a new window W7 as shown in FIG. 17 is opened to display a catalog of graphs G each resulting from interpretation of a data item stored in the area "multi-data graph BITMAP" as image data. Since the analysis file (file name: Test) contains plural analysis data items, four graphs are displayed in the window W7 at a time. If the number of analysis data items stored in the analysis file 321 is four or more, desired ones of the graphs displayed in the window W7 or other graphs can be selected and displayed by a pull-down menu button B, as shown in FIG. 18.

The number of graphs to be displayed in the window W7 can be established as desired.

Further, when the operator selects plural icons I and performs a predetermined action (right-clicking for example) thereon, the receiving section 33 receives a corresponding icon selection signal (step Sc3) and the icon generating section 34 opens a new window displaying only the selected icons I (step Sc4.)

If the operator selects a desired icon I and performs a predetermined action (double-clicking for example) thereon in either one of the steps Sc2 and Sc4, the main application section 31 starts up to open the analysis file 321 selected by the operator.

The following description is directed to a specific example of display on a screen.

Here, consideration will be given to a case where plural analysis files 321 are stored in one file folder FF (folder name: NGBFiles, for example.)

When the operator selects the file folder FF displayed on the left-hand side in window W5 opened by starting up Windows Explorer, icons I each indicative of a respective one of the files stored in the file folder FF are displayed on the right-hand side in window W5. If plural (three in this embodiment) analysis data items are stored in one file, standardized graphs G each representing a respective one of the plural (three) analysis outcomes are displayed within, for example, one icon I based on data on the graphs G stored in the area "multi-data graph BITMAP."

Such a configuration is conceivable that when the operator moves the cursor to a desired icon I, the icon generating section 34 displays subsidiary items T stored in the area "data information" in a predetermined region situated adjacent that icon I or elsewhere.

As described above, the particle size distribution analyzer 1 according to the present embodiment is capable of easy file retrieval using such general-purpose software as Windows Explorer for managing files and the like without using the main application section 31 configured to open and operate an analysis file 321. Thus, the analyzer 1 can retrieve a desired file 321 quickly and hence can perform necessary operations efficiently.

Further, the feature that plural analysis data items are stored in one file 321 makes it possible to facilitate such processing as to calculate a mean value of plural analysis outcomes as well as to ease management if plural analysis data items obtained under the same measuring condition are collectively stored in one analysis file. Moreover, the number of files 321 can be reduced, which is advantageous in file management.

The present invention is not limited to the foregoing embodiments. For example, the present invention may be applied to other analyzers including a Fourier transform infrared spectrophotometer than a particle size distribution analyzer. In the case where the present invention is applied to such a Fourier transform infrared spectrophotometer, specific examples of subsidiary items to be displayed within an icon display area include a file name, title, date and time of measurement, number of scans, gain, mirror speed, resolving power, FFT function, temperature, pressure, Y-axis information, effective measuring range, and arithmetic variance.

What is to be displayed in an icon display area or a predetermined area of a dialog window is not limited to a graph representing the outcome of an analysis and subsidiary items in text form. For example, each of these areas may display a graph representing the outcome of an analysis contained in an analysis file and a graph representing measuring conditions.

Each of the first and second embodiments is configured such that if the operator does not input a subsidiary item data selection signal, any subsidiary item in text form is not displayed within the icon display area or the predetermined area of the dialog window. However, there is no particular limitation thereto since a configuration is possible that if the operator does not input any subsidiary item data selection signal, a predetermined subsidiary item in text form is automatically displayed within the icon display area or the predetermined area of the dialog window.

The first embodiment may be modified such that when the cursor is moved to an icon, an additional subsidiary item is displayed in a region around that icon, in addition to the subsidiary item displayed within the icon display area. Also, the second embodiment may be modified such that when the cursor is moved to a file name displayed in the dialog window, a subsidiary item stored in that file is displayed.

In the case where neither the area "multi-data graph BITMAP" nor the area "data graph BITMAP" has any graph G stored therein, a graph G is drawn based on display data only at the first time and the resultant image thus created is stored in those areas. Once such an image has been stored in those areas, the graph G can be displayed without conversion processing.

The aforementioned information processing apparatus may be a microcomputer installed in the measuring section.

The foregoing embodiments and variations may be appropriately combined either partially or wholly.

While only certain presently preferred embodiments of the present invention have been described in detail, as will be apparent to those skilled in the art, certain changes and modifications may be made in embodiment without departing from the spirit and scope of the present invention as defined by the following claims.

Those skilled in the art will appreciate that various adaptations and modifications of the just-described preferred embodiment can be configured without departing from the scope and spirit of the invention. Therefore, it is to be understood that, within the scope of the amended claims, the invention may be practiced other than as specifically described herein.

What is claimed is:

1. An analyzer system comprising:
a file storage section configured to store an analysis data file resulting from an analysis of a subject and subsidiary items including conditions under which measurement has been carried out in the analysis;
an icon generating section configured to generate an icon indicative of the analysis data file on a screen;
a main application section that is a program configured to open and operate the analysis data file,
wherein the icon generating section is operative to graph analysis data contained in the analysis data file according to a predetermined standard without starting up the main application section and then display a resulting graph within an icon display area for the icon indicative of the analysis data file as well as to display in text form at least a part of the subsidiary items contained in the analysis data file within the icon display area together with the graph in a side-by-side arrangement; and
an analyzer configured to measure particles dispersed in a dispersing medium; and
the particles are measured based on diffracted and/or scattered of light obtained by irradiating light to the particles.

2. An analyzer comprising:
a file storage section configured to store an analysis data file resulting from an analysis of a subject and subsidiary items including conditions under which measurement has been carried out in the analysis by the analyzer;
a dialog window generating section configured to generate a dialog window for displaying file names of data analysis files on a screen in a catalogued fashion; and
a main application section that is a program configured to open and operate each of the analysis data files,
wherein the dialog window generating section is operative to graph analysis data contained in the analysis data file selected by an operator according to a predetermined standard without starting up the main application section and then display a resulting graph within a predetermined display area of the dialog window as well as to display in text form at least a part of the subsidiary items contained in the selected analysis data file within the predetermined display area of the dialog window together with the graph; and
wherein the analyzer can measure particles dispersed in a dispersing medium;
and the particles are measured based on diffracted and/or scattered of light obtained by irradiating light to the particles.

3. The analyzer according to claim 2, further including an input unit which allows an operator to select subsidiary items to be displayed within the icon and then to rearrange the selected subsidiary items.

4. An analyzer comprising:
- a file storage section configured to store an analysis data file resulting from an analysis of a subject;
- an icon generating section configured to generate an icon indicative of the analysis file on a screen; and
- a main application section that is a program configured to open and operate the analysis data file, wherein:
- the icon generating section is operative to interpret data existing in a predetermined area of the analysis data file as image data and then display an image corresponding to the image data as an icon without opening the analysis data file; and
- the file storage section is operative to store image data obtained by graphing an outcome resulting from the analysis of the subject according to a predetermined standard into the predetermined area of the analysis data file,
- wherein the analyzer can measure particles dispersed in a dispersing medium; and
- the particles are measured based on diffracted and/or scattered of light obtained by irradiating light to the particles.

5. The analyzer according to claim 4, wherein the file storage section is operative to store a plurality analysis outcome data items into one analysis file and then store image data obtained by graphing at least one of the plurality of analysis outcome data items according to a predetermined standard into a predetermined area of the analysis data file.

6. An analyzing system comprising:
- a file storage section configured to store an analysis data file including a plurality of analysis data items representing the outcome of an analysis of a subject;
- a main application section that is a program configured to open and operate the analysis data file;
- an icon generating section configured to generate an icon indicative of the content of the analysis data items included in the stored analysis data file, the icon generating section operative to interpret data existing in a predetermined area of the analysis data file as image data and then display an image corresponding to the image data as an icon without opening the analysis data file; and
- an analyzer configured to measure particles dispersed in a dispersing medium; and
- the particles are measured based on diffracted and/or scatter of light obtained by irradiating light to the particles.

* * * * *